S. B. WHITE.
ENVELOP SEALING MACHINE.
APPLICATION FILED MAY 23, 1912.

1,090,771.

Patented Mar. 17, 1914.
4 SHEETS—SHEET 2.

S. B. WHITE.
ENVELOP SEALING MACHINE.
APPLICATION FILED MAY 23, 1912.

1,090,771.

Patented Mar. 17, 1914.

4 SHEETS—SHEET 3.

Witnesses
F. C. Gibson.
B. M. Kent.

Inventor
Samuel B. White
by Foster Freeman Watson & Coit
Attorneys

S. B. WHITE.
ENVELOP SEALING MACHINE.
APPLICATION FILED MAY 23, 1912.
1,090,771.
Patented Mar. 17, 1914.
4 SHEETS—SHEET 4.
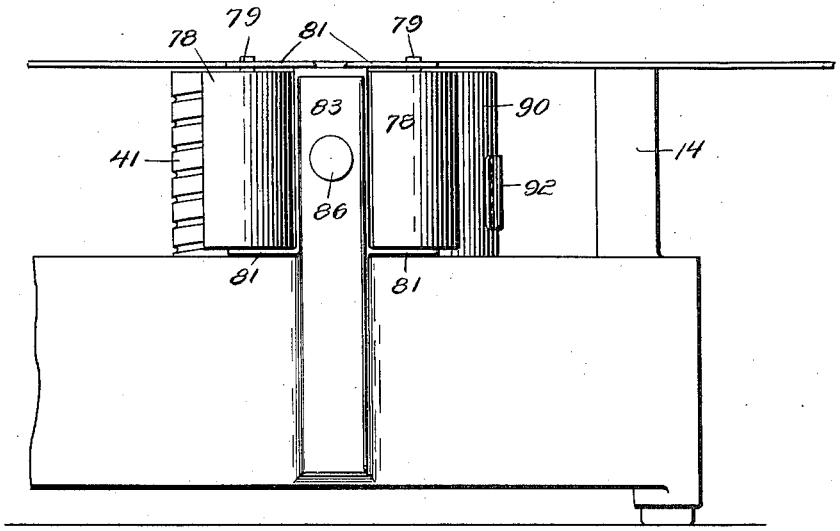
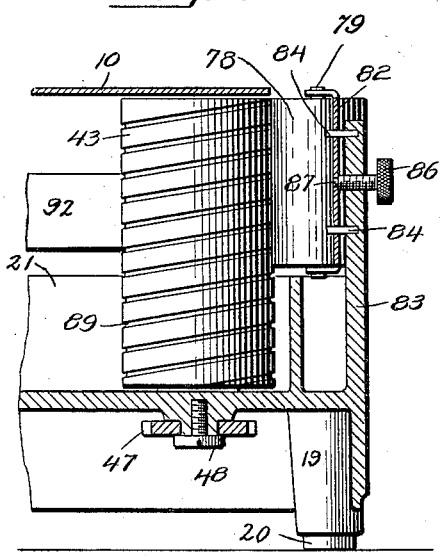
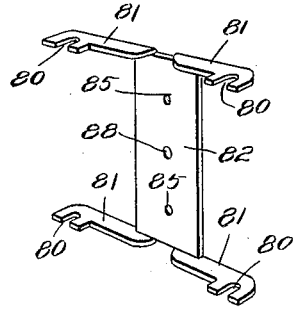
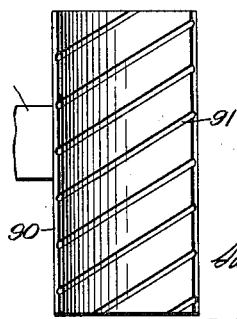
Witnesses
F. C. Gibson.
B. M. Kent.
Inventor
Samuel B. White
by Foster Freeman Watson & Coit
Attorneys

UNITED STATES PATENT OFFICE.

SAMUEL B. WHITE, OF PROVIDENCE, RHODE ISLAND, ASSIGNOR TO OFFICE APPLIANCE MANUFACTURING COMPANY, OF PROVIDENCE, RHODE ISLAND, A CORPORATION OF RHODE ISLAND.

ENVELOP-SEALING MACHINE.

1,090,771. Specification of Letters Patent. Patented Mar. 17, 1914.

Application filed May 23, 1912. Serial No. 699,341.

*To all whom it may concern:*

Be it known that I, SAMUEL B. WHITE, a citizen of the United States, residing at Providence, in the county of Providence and State of Rhode Island, have invented certain new and useful Improvements in Envelop-Sealing Machines, of which the following is a specification.

This invention relates to machines for automatically moistening the gummed flaps of mailing envelops and for sealing the same and has for its object the provision of a machine which will be simple in construction, efficient in operation and comparatively inexpensive to manufacture.

Figure 1:
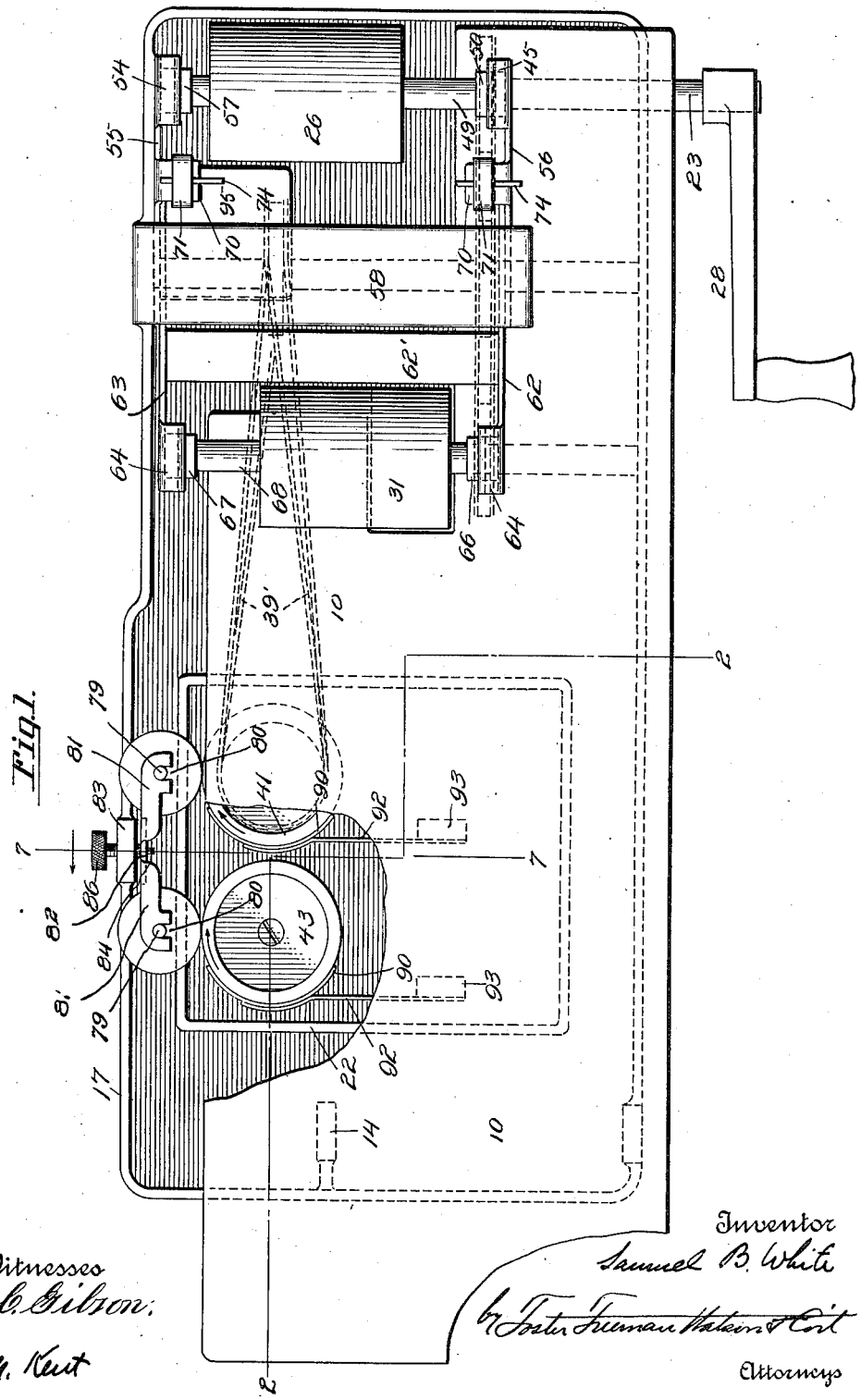
Figure 2:
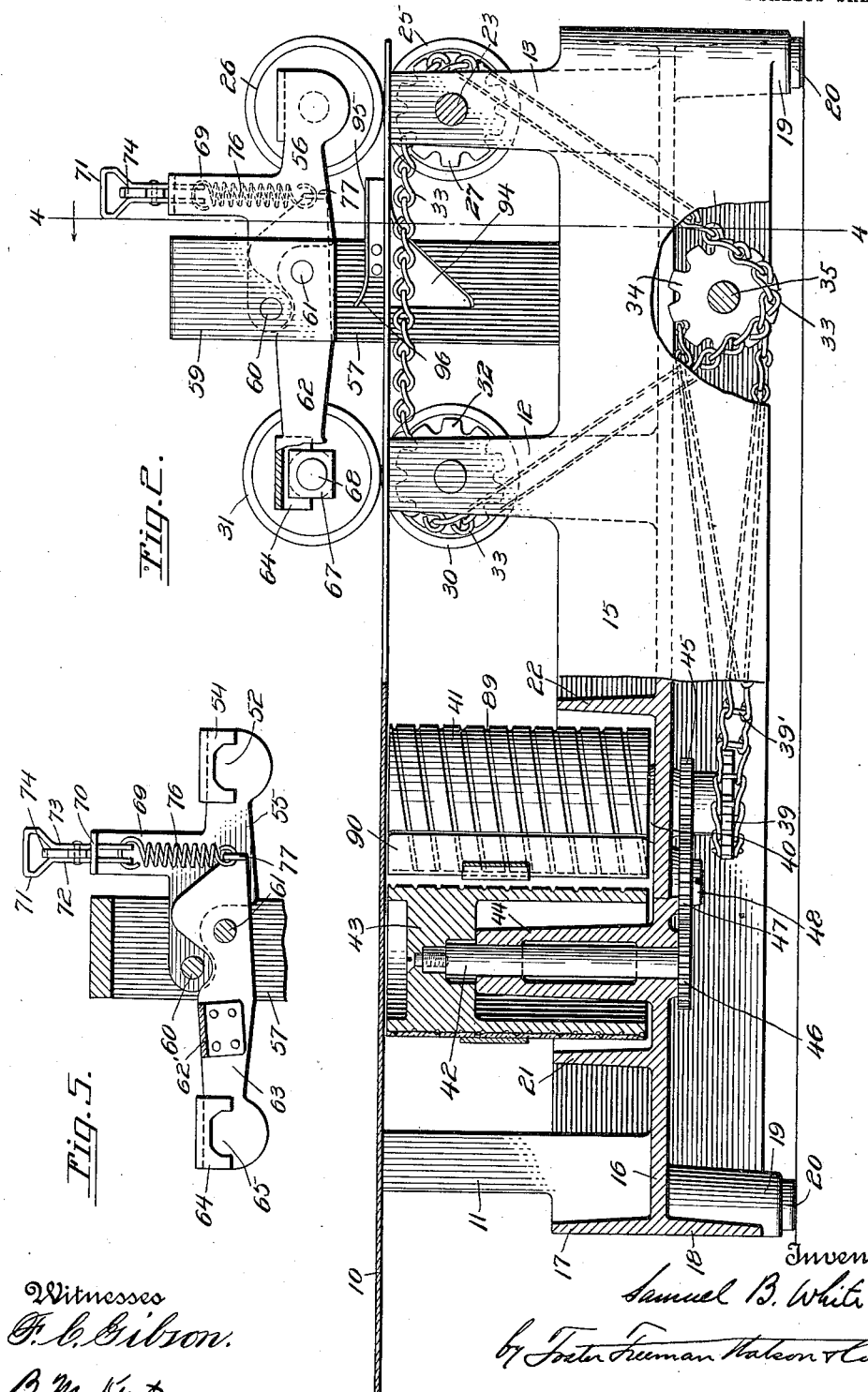
Figure 3:
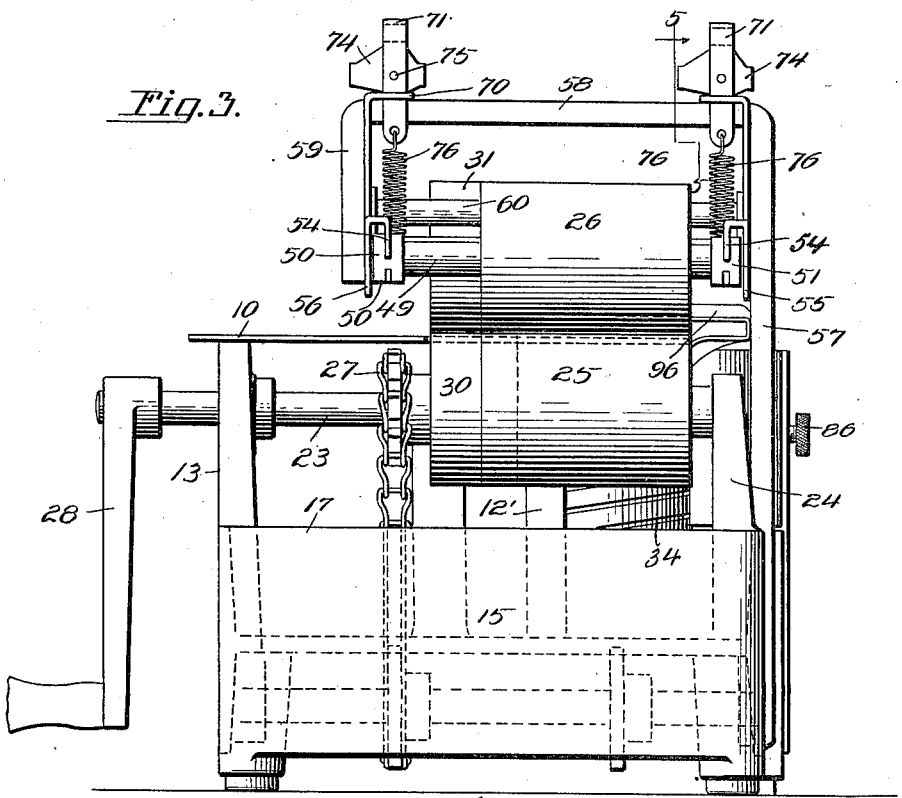
Figure 4:
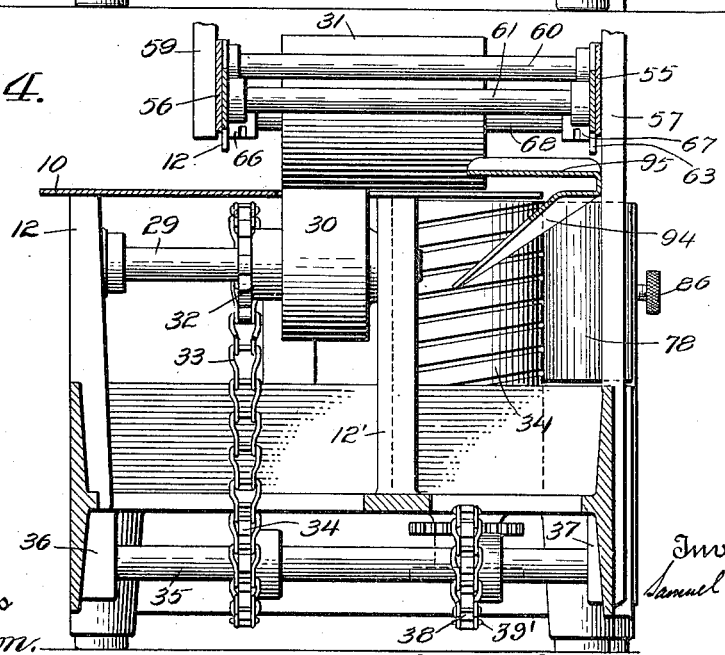

Other objects and the features of novelty will be apparent from the following description taken in connection with the accompanying drawings, in which:

Figure 1 is a plan view of a machine embodying my invention; Fig. 2 is a side elevation with certain parts shown in section on the line 2—2 of Fig. 1; Fig. 3 is an elevation of the delivery end of the machine; Fig. 4 is a transverse section on the line 4—4 of Fig. 2; Fig. 5 is a detail section on the line 5—5 of Fig. 3; Fig. 6 is a side elevation of the moistening mechanism; Fig. 7 is a section on the line 7—7 of Fig. 1. Fig. 8 is a perspective view of a detail; and Fig. 9 is an elevation of a detail.

Throughout the different views like reference characters have been used to designate the same parts.

Referring to the drawings it will be observed that the machine comprises a table 10 which is supported upon uprights 11, 12, 12', 13, and 14 which are secured to the frame 15 in any suitable manner, but which I prefer to form integral therewith. The frame 15 consists preferably of a plate 16 having an upwardly extending marginal flange 17 and a corresponding downwardly extending flange 18. The frame is provided at the corners with legs 19 having suitable cushions or pads 20 in their lower ends adapted to support the machine on a table or any other suitable support. Near one end of the frame are arranged the transversely extending ribs 21 and 22 which coöperate with the flange 17 to form a trough for water to be used in moistening the gum on the flaps of the envelops.

A shaft 23 is mounted in suitable bearings arranged in the uprights 13 and 24 carried by the frame 15. A roll 25 is mounted on the shaft 23 and coöperates with a roll 26 arranged thereabove and pressing downwardly thereon to firmly press the flaps against the back of the envelops in order to seal them. The shaft 23 also carries a sprocket wheel 27 and a crank 28 for operating the machine. It will, of course, be understood that in place of the crank 28, which is provided when the machine is manually operated, I may use any suitable means for operating the machine by power. A shaft 29 is supported in suitable bearings in the uprights 12 and 12' and carries a roll 30 which coöperates with a roll 31, arranged thereabove and pressing thereon, to feed the envelops through the machine to the sealing rolls. The shaft 29 carries a sprocket wheel 32 which is preferably arranged in line with the sprocket 27 and driven from the latter by means of a chain 33, this chain also passing over a sprocket 34 on the shaft 35. The shaft 35 is mounted in bearings 36 and 37 in the flange 18 and carries in addition to the sprocket wheel 34 a sprocket wheel 38 which drives the sprocket wheel 39 by means of a chain 39'. The sprocket 39 is mounted on an upright shaft which is arranged in a bearing 40 and carries on its upper end the moistening roll 41. The arrangement of this upright shaft is similar to that of the shaft 42 which carries the roll 43 and is arranged in a bearing 44. The bearings 40 and 44, as will be seen from Fig. 2, are preferably formed integral with the plate 16 and extend upwardly therefrom to a point above the top of the flange 17 and support on their top face the hubs of the rolls 41 and 43. The shaft of the roll 41 and shaft 42 are provided with gears 45 and 46 respectively, these gears meshing with an intermediate gear 47 by means of which the gear 46 is driven from the gear 45. The gear 47 may be mounted on a fixed stud 48 in any well known manner.

The roll 26 is mounted on a shaft 49 which is carried in bearings 50 and 51. The bearings 50 and 51 are loosely mounted in suitable recesses 52 in the downwardly extending brackets 54 carried by the levers 55 and 56. The frame 15 carries an upwardly extending arm 57 which has a horizontally extending portion 58 at the top. An arm 59 extends downwardly from the outer end of the horizontal portion 58. A shaft 60 is mounted in bearings in the arms 57 and 59 and has pivotally mounted thereon the levers 55 and 56. The arms 57 and 59 also carry a shaft 61, on which are pivotally mounted the levers 62 and 63. The levers 62 and 63 are connected together by a member 62′ and extend in the opposite direction from the levers 55 and 56 and are provided at their free ends with brackets 64 which are similar to the brackets 54 and provided with recesses 65 similar to the recesses 52 and in which are arranged the bearings 66 and 67 which carry the shaft 68, on which is mounted the roll 31. The levers 55 and 56 are each provided with an upward extension 69 having a horizontal arm 70 at the top. Members 71, consisting preferably of a bar bent to form the parallel sides 72 and 73 which are connected at the top, extend through suitably formed openings in the arms 70 and have pivotally mounted thereon the cams 74. These cams, as will be seen from Fig. 3, preferably consist of an irregularly shaped disk having a plurality of edges spaced different distances from the pivots 75, on which the cams 74 are mounted. The lower ends of the members 71 have connected thereto springs 76, the lower ends of these springs being connected with inwardly extending arms 77 carried by the levers 62 and 63.

It will be seen that by the arrangement just described the springs 76 tend to press the rolls 26 and 31 against the rolls 25 and 30, respectively, and that the pressure with which these rolls are pressed together may be varied by turning the cams 74 on the pivots 75 so as to bring different edges of the cams into engagement with the arms 70. From Fig. 3 it will be seen that the members 71 may be raised or lowered and the tension of the springs 76 correspondingly varied by turning the cams 74 to different positions.

The moistening rolls 41 and 43 extend above the trough, formed by the ribs 21 and 22 and the flange 17, to a point preferably just beneath the table 10, as will be clearly seen from Fig. 2. In order to moisten the gummed portions of the envelop flaps they are made to contact with the surface of the rolls 41 and 43 by means of the idler rolls 78 which are provided with spindles 79, the latter being mounted in the recesses 80 in the arms 81 carried by the upright plate 82 (see Fig. 8). The plate 82 is carried by an upright arm 83 on the frame of the machine, this arm being provided with the inwardly projecting pins 84 which engage suitable openings 85 in the plate 82. In order to force the rolls 78 against the rolls 41 and 43 I have provided a screw 86 which has screw-threaded engagement with the arm 83 and has its inner end bearing against the plate 82. The screw may be provided with a point 87 adapted to engage an opening 88 in the plate 82 for the purpose of holding the parts in proper position.

From Figs. 7 and 8 it will be seen that the pressure of the rolls 78 against the rolls 41 and 43 may be varied by means of the screw 86 and also that there will be a certain flexibility in the arms 81 which will permit the rolls 78 to spring away from the rolls 41 and 43. Also by mounting the plate 82 on the pins 84 a flexible connection is provided which permits the rolls 78 to have a slight rocking movement as the flaps of the envelops are passed between these rolls and the rolls 41 and 43.

In the operation of the machine the envelops are fed along the table 10 with the flaps extending downwardly over the edge thereof so that they will pass between the rolls 78 and the rolls 41 and 43, the gummed surface of the flaps coming in contact with the rolls 41 and 43. Since the moistening rolls also serve to convey the envelops to the feeding rolls it will be seen that by providing two moistening rolls the envelops will be moved straight into the feeding rolls and prevented from twisting. In order to convey water from the trough, in which the lower ends of the rolls 41 and 43 are placed, to the upper portion of these rolls where it is adapted to moisten the gummed portions of the flaps I provide the rolls 41 and 43 with a plurality of spiral grooves 89, the number and pitch of these grooves depending largely upon the speed at which the machine is operated. Bearing against the outer surface of the rolls 41 and 43, and coöperating therewith to convey water from the trough to the upper portion of the rolls, are the members 90 which closely fit the outer surface of the rolls 41 and 43 and are preferably, though not necessarily, provided on their inner surface with grooves 91 which may have a steeper pitch than the grooves 89 in the rolls 41 and 43, but in the opposite direction to the pitch of the grooves 89. The members 90 have secured on the exterior thereof the arms 92 by means of which they may be supported on suitable uprights 93.

The operation of the moistening mechanism is as follows: The rolls 41 and 43 rotate in the direction of the arrows shown in Fig. 1. Owing to the fact that the lower ends of the rolls 41 and 43 are submerged in the water in the trough and the members 90 extend preferably the full length of the rolls 41 and 43 it will be seen that water enters the grooves 89 and passing between the rolls and the members 90 will be carried upwardly along the surface of the rolls by the grooves 89 and the grooves 91, when the latter are used, due largely to capillary attraction. I have found that by varying the pitch of the grooves 89 and 91 and also by omitting one set of grooves or varying the number of the grooves the quantity of water conveyed to the upper portion of the rolls may be varied for any given speed of the rolls. I have also found that it is preferable to use two moistening rolls because after the gummed surface of the flap has passed one roll and become slightly moistened it absorbs moisture from the second roll much more readily than if the same quantity of moisture is delivered to the flap by a single roll. It will, however, be understood that the mechanism operates very satisfactorily when a single roll is used, but it is possible to increase the capacity of the machine by providing two moistening rolls.

In order to turn the flap against the envelop after it has been moistened I have provided the inclined plate 94 which is arranged on the under side of the table 10 between the rolls 25 and 30 and so formed that when the flap of the envelop strikes this plate it will be turned upwardly against the under surface of the envelop so that by the time the envelop reaches the sealing rolls 25 and 26 the flap is in position to be sealed. The plate 94 may be secured to the upright arm 57, or any other suitable part of the machine and may be provided with a horizontally extending portion 95 arranged above the table 10 and having its rear edge turned upwardly as at 96 for the purpose of guiding the envelops to the sealing rolls 25 and 26. The sealing rolls 25 and 26 are preferably of sufficient width to press the entire flap against the envelop and the rolls 30 and 31 are preferably arranged well toward the middle of the machine so as to not interfere with the folding of the flap against the envelop.

From the drawings it will be seen that the flap of the envelop will engage a portion of the moistening rolls which is always above the water in the trough and that this portion of the rolls will receive a regular and definite supply of water at all times, and it has been found that the quantity of water delivered to the upper portion of the moistening rolls is to a large extent independent of the quantity of water in the trough. This arrangement has been found to produce much more satisfactory results than an arrangement of the moistening rolls in which the portion of the rolls which moistens the flaps passes through the water in the trough. It has been found that the supply of water in such devices is more or less irregular, depending to a large extent on the speed at which the machine is operated and the quantity of water in the trough and therefore does not moisten the flaps uniformly.

By flexibly mounting the rolls 26 and 31 it will be seen that the rolls will automatically adjust themselves to envelops of different thicknesses and also by varying the tension of the springs 76 the pressure of the rolls on the envelop may be adjusted to correspond with the thickness thereof.

It will be understood that various changes in the details of construction of the machine may be made within the scope of the claims and therefore I do not wish to be limited to the precise details shown and described as these are intended to be merely illustrative of the principles of my invention.

Having thus described the invention what is claimed as new is:

1. In a machine of the class described, the combination of a table, moistening mechanism, a rigidly mounted feeding roll, a rigidly mounted sealing roll, a pair of pivotally mounted levers, an idler roll carried by said levers and coöperating with said feeding roll, a second pair of pivotally mounted levers, an idler roll carried by said second pair of levers and coöperating with said sealing roll, and springs common to both of said pairs of levers for adjusting the pressure of said idler rolls on said feeding and sealing rolls.

2. In a machine of the class described, the combination of a table, moistening mechanism, a feeding roll, a sealing roll, idler rolls coöperating with said feeding and sealing rolls, springs for forcing said idler rolls against said sealing and feeding rolls, and means for adjusting the tension of said springs comprising a pivotally mounted polygonal disk, the sides of which are at different distances from the pivot thereof.

3. In a machine of the class described, the combination of a table, moistening mechanism, a feeding roll, a sealing roll, a pair of pivotally mounted levers, an idler roll carried by said levers and coöperating with said feeding roll, a second pair of said pivotally mounted levers, an idler roll carried by said second pair of levers and coöperating with said sealing roll, and a pair of springs each of which is connected with one of each of said pairs of levers for the purpose of pressing said idler rolls against said feeding and sealing rolls.

4. In a machine of the class described, the combination of a table, feeding mechanism, sealing mechanism, a moistening mechanism comprising a roll having spirally arranged grooves in its outer surface, means for applying a liquid to the lower part of said roll, and means for causing said liquid to be conveyed to the upper part of said roll.

5. In a machine of the class described, the combination of a table, feeding mechanism, sealing mechanism, a moistening roll arranged below the plane of said table and having spirally arranged grooves in its outer surface, a plate arranged to press against the outer surface of said roll, and means for applying liquid to the lower portion of said roll.

6. In a machine of the class described, the combination of a table, feeding mechanism, sealing mechanism, a moistening roll arranged below the plane of said table and adapted to have its upper portion engaged by the flap of the envelop, said roll having spirally arranged grooves in its outer surface, a curved plate arranged to press against the outer surface of said roll, and means for applying a liquid to the lower part of said roll.

7. In a machine of the class described, the combination of a table, feeding mechanism, sealing mechanism, a moistening roll arranged below the plane of the table and adapted to have the upper part thereof engaged by the flap of the envelop, said roll having spirally arranged grooves in its outer surface, a curved plate arranged to press against the outer surface of said roll and having grooves on its inner face, and means for applying a liquid to the lower portion of said roll below the part thereof which is engaged by the flap of the envelop.

8. In a machine of the class described, the combination of a table, feeding mechanism, sealing mechanism, a moistening roll arranged below the plane of the table and adapted to have the upper portion thereof engaged by the flap of the envelop, said roll having spirally arranged grooves in its outer surface, a curved plate arranged to press against the outer surface of said roll and having grooves therein inclined in the opposite direction to the grooves on said roll, and means for applying a liquid to the lower portion of said roll below the part thereof which is engaged by the flap of the envelop.

9. In a machine of the class described, the combination of a table, feeding mechanism, sealing mechanism, a moistening roll arranged below the plane of the table and adapted to have the upper portion of its outer surface engaged by the flap of the envelop, said roll having spirally arranged grooves in its outer surface, a curved plate arranged to press against the outer surface of said roll and having grooves in the face thereof contacting with said roll and inclined in the opposite direction to the grooves on said roll but at a steeper pitch than the latter, and means for applying a liquid to the lower portion of said roll below the part thereof which is engaged by the flap of the envelop.

10. In a machine of the class described, the combination of a table, feeding mechanism, sealing mechanism, a vertically arranged cylindrical moistening roll below the plane of said table and adapted to have the upper portion thereof engaged by the flap of the envelop, said roll having spirally arranged grooves in its outer surface extending over substantially the full length of the roll, a curved plate fitting against the outer surface of said roll and having grooves on the inner side thereof inclined in the opposite direction to the grooves on said roll, and means for applying a liquid to said roll below the part thereof which is engaged by the flap of the envelop.

11. In a machine of the class described, the combination of a table, feeding mechanism, sealing mechanism, a vertically arranged cylindrical moistening roll below the plane of said table and adapted to have the upper portion thereof engaged by the flap of the envelop, said roll having spirally arranged grooves in its outer surface extending over substantially the full length thereof, a curved plate of substantially the same length as said roll and fitting the outer surface thereof and having grooves on its inner side inclined in the opposite direction to the grooves on said roll, and means for applying a liquid to said roll below the part thereof which is engaged by the flap of the envelop.

12. In a machine of the class described, the combination of a table, feeding mechanism, sealing mechanism, a trough arranged below said table, a vertically arranged cylindrical moistening roll having the lower portion thereof in said trough, said roll having spirally arranged grooves in its outer surface and extending substantially the full length thereof, a curved plate of substantially the same length as said roll and fitting the outer surface thereof and having grooves on its inner side inclined in the opposite direction to the grooves on said roll, and means for operating said feeding and sealing mechanism and said moistening roll.

13. In a machine of the class described, the combination of a table, feeding mechanism, sealing mechanism, a trough arranged below said table, a vertically arranged moistening roll having the lower part thereof in said trough, said roll having spirally arranged grooves in the outer surface thereof, means for pressing the flap of the envelop against the upper portion of said roll, a curved plate arranged to press against the outer surface of said roll and having grooves on the inner side thereof inclined in the opposite direction to the grooves on said roll, and means for operating said feeding and sealing mechanism and said moistening roll.

14. In a machine of the class described, the combination of a table, feeding mechanism, sealing mechanism, a trough arranged below said table, a pair of vertically arranged moistening rolls having the lower portion thereof in said trough, said rolls having spirally arranged grooves in their outer surface, means for pressing the flap of the envelop against the upper portion of said rolls, means arranged to press against the outer surface of said rolls and adapted to convey liquid from said trough to the portion of said rolls engaged by the flap of the envelop, and means for operating said feeding and sealing mechanism and said moistening rolls.

15. In a machine of the class described, the combination of a table, feeding mechanism, sealing mechanism, a trough arranged below said table, a pair of vertically arranged cylindrical moistening rolls below said table and having the lower portion thereof in said trough, said rolls having spirally arranged grooves in the outer surface thereof, curved plates fitting the outer surface of said rolls and extending substantially the full length thereof and provided with grooves on the inner surface inclined in the opposite direction to the grooves on said rolls, means for pressing the flap of the envelop against said rolls as it moves along said table, and means for operating said feeding and sealing mechanism and said moistening rolls.

16. In a machine of the class described, the combination of a table, feeding mechanism, sealing mechanism, a trough arranged below said table, a pair of vertically arranged cylindrical moistening rolls having the lower portion thereof in said trough and one side thereof substantially in vertical alinement with one edge of said table, said rolls having spirally arranged grooves in their outer surface extending over substantially the full length thereof, yieldingly mounted rolls adapted to press the flap of the envelop against the moistening rolls, curved plates engaging the outer surface of said rolls and extending substantially the full length thereof and having grooves on their inner sides inclined in the opposite direction to the grooves on said rolls, and means for operating said feeding and sealing mechanism and said moistening rolls.

In testimony whereof I affix my signature in presence of two witnesses.

SAMUEL B. WHITE.

Witnesses:
GEORGE KOLLETITH,
EDITH McANDREW.

---

Copies of this patent may be obtained for five cents each, by addressing the "Commissioner of Patents, Washington, D. C."